US012662608B2

(12) United States Patent
Bai et al.

(10) Patent No.: US 12,662,608 B2
(45) Date of Patent: Jun. 23, 2026

(54) WATERBORNE COATING COMPOSITION

(71) Applicant: ARKEMA FRANCE, Puteaux (FR)

(72) Inventors: Chenyan Bai, Shanghai (CN); Yin Xue, Shanghai (CN); Xinhong Wang, Shanghai (CN); Wenxin Zhang, Shanghai (CN)

(73) Assignee: ARKEMA FRANCE, Puteaux (FR)

( * ) Notice: Subject to any disclaimer, the term of this patent is extended or adjusted under 35 U.S.C. 154(b) by 320 days.

(21) Appl. No.: 18/275,154

(22) PCT Filed: Feb. 2, 2021

(86) PCT No.: PCT/CN2021/074786
§ 371 (c)(1),
(2) Date: Jul. 31, 2023

(87) PCT Pub. No.: WO2022/165619
PCT Pub. Date: Aug. 11, 2022

(65) Prior Publication Data
US 2024/0067845 A1     Feb. 29, 2024

(51) Int. Cl.
| | |
|---|---|
| *C09D 175/06* | (2006.01) |
| *B32B 15/082* | (2006.01) |
| *B32B 15/20* | (2006.01) |
| *B32B 27/30* | (2006.01) |
| *B32B 27/40* | (2006.01) |
| *B32B 37/24* | (2006.01) |
| *C08G 18/08* | (2006.01) |
| *C08G 18/42* | (2006.01) |
| *C08G 18/75* | (2006.01) |

(52) U.S. Cl.
CPC .......... *C09D 175/06* (2013.01); *B32B 15/082* (2013.01); *B32B 15/20* (2013.01); *B32B 27/304* (2013.01); *B32B 27/40* (2013.01); *B32B 37/24* (2013.01); *C08G 18/0866* (2013.01); *C08G 18/4202* (2013.01); *C08G 18/755* (2013.01); *B32B 2037/243* (2013.01); *B32B 2250/02* (2013.01); *B32B 2255/06* (2013.01); *B32B 2255/26* (2013.01)

(58) Field of Classification Search
CPC .. C09D 175/06; C09D 175/08; B32B 15/082; B32B 15/20; B32B 27/304; B32B 27/40; B32B 37/24; B32B 2037/243; B32B 2250/02; B32B 2255/06; B32B 2255/26; C08G 18/0866; C08G 18/4202; C08G 18/755; C08G 18/12; C08G 18/3228; C08G 18/636; C08L 75/06; C08L 33/06; C09J 175/06; C09J 175/08
See application file for complete search history.

(56) References Cited

U.S. PATENT DOCUMENTS

| | | |
|---|---|---|
| 6,210,758 B1 | 4/2001 | McNeil et al. |
| 6,437,036 B1 | 8/2002 | Gessner et al. |
| 2015/0354133 A1 | 12/2015 | Yan et al. |
| 2018/0134020 A1 | 5/2018 | Pfeifer et al. |
| 2018/0163086 A1 | 6/2018 | Crombie et al. |
| 2019/0248947 A1 | 8/2019 | Yu et al. |

FOREIGN PATENT DOCUMENTS

| | | | |
|---|---|---|---|
| CN | 111471417 A | 7/2020 | |
| EP | 2616494 B1 * | 6/2019 | ............ C09J 175/06 |

OTHER PUBLICATIONS

Petrie "The Importance of Glass Transition Temperature in formulating adhesives and sealants" (Year: 2003).*

* cited by examiner

*Primary Examiner* — Blaine Copenheaver
(74) *Attorney, Agent, or Firm* — Gemini Law LLP

(57) ABSTRACT

A waterborne coating composition, comprising (a) a first polyurethane dispersion comprising a first polyurethane having a Tg of 5° C. to 20° C., (b) a second polyurethane dispersion comprising a second polyurethane having a Tg of −40° C. to −60° C., and (c) a polyacrylic emulsion comprising an acrylic (co) polymer having a Tg of −40° C. to −20° C., is provided. A method for preparing a laminated material with the waterborne coating composition, and a laminated material prepared therefrom are also provided.

10 Claims, No Drawings

WATERBORNE COATING COMPOSITION

FIELD OF THE INVENTION

The present disclosure relates to the technical field of coating material, and in particular to a waterborne coating composition comprising one polyacrylic emulsion and two different polyurethane dispersions.

BACKGROUND

PTP (Press through Packaging) sheet is one of the most popular packaging materials for medical pack around the world and the adhesives used for preparing the PTP were basically solvent based (SB), which are becoming increasingly undesirable due to the organic solvents emitted during the manufacture procedure, such as coating and curing steps, and subsequent storage, transportation and use. With stricter VOC emission regulation issued in many countries in recent years, suppliers of the PTP sheet have been endeavoring to develop an Eco-friendly solution to replace the organic solvent based adhesives currently used for preparing PTP foil. Several WB (waterborne) coating materials for PTP application have been reported, in which several emulsions or dispersions of some different polymers have been specifically formulated, but none of these WB coating materials is able to achieve a combination of superior performance properties including free of VOC (volatile organic compound), economic viability, as well as superior heat seal strength and blocking resistance better than or at least comparable to those of the commercially available SB (solvent borne) coating materials.

From the foregoing, it will be appreciated that a WB coating composition, which can be readily prepared with limited cost and exhibits superior performance properties as stated above, are still eagerly desirable.

After persistent exploration, we have surprisingly found a WB polyurethane coating composition which can achieve the above targets.

SUMMARY OF THE INVENTION

The present disclosure provides a unique waterborne coating composition for PTP foil application, a method of preparing a laminate material by using the waterborne coating composition, and a laminate material prepared with same.

In the first aspect of the present disclosure, the present disclosure provides a waterborne coating composition, comprising (a) a first polyurethane dispersion, comprising a first polyurethane having a Tg of 5° C. to 20° C., (b) a second polyurethane dispersion, comprising a second polyurethane having a Tg of –40° C. to –60° C., and (c) a polyacrylic emulsion, comprising an acrylic (co)polymer having a Tg of –40° C. to –20° C.

According to an embodiment of the present disclosure, the first polyurethane is derived from first raw materials comprising 15% to 45% by weight of at least one first monomeric diisocyanate, 40% to 75% by weight of at least one first polyol, and 2% to 15% by weight of at least one first internal emulsifier, based on total dry weight of the first polyurethane dispersion. According to another embodiment of the present disclosure, the second polyurethane is derived from second raw materials comprising 20% to 35% by weight of at least one second monomeric diisocyanate, 50% to 75% by weight of at least one second polyol, and 2% to 10% by weight of at least one second internal emulsifier, by weight based on total dry weight of the second polyurethane dispersion. According to another embodiment of the present disclosure, the acrylic (co)polymer is derived from third raw materials comprising 60% to 90% by weight of at least one (meth)acrylic monomer and 10% to 40% by weight of at least one styrenic monomer.

According to another embodiment of the present disclosure, each of the first monomeric diisocyanate and the second monomeric diisocyanate is independently selected from the group consisting of $C_2$-$C_{16}$ aliphatic diisocyanate, $C_6$-$C_{16}$ aromatic diisocyanate, $C_5$-$C_{16}$ cycloaliphatic diisocyanate, and combination thereof.

According to another embodiment of the present disclosure, each of the first polyol and the second polyol is independently selected from the group consisting of $C_2$-$C_{16}$ aliphatic polyhydric alcohols comprising at least two hydroxyl groups, $C_6$-$C_{15}$ cycloaliphatic or aromatic polyhydric alcohols comprising at least two hydroxyl groups, $C_7$-$C_{15}$ araliphatic polyhydric alcohols comprising at least two hydroxyl groups, poly($C_4$-$C_{12}$ lactone) polyol having an average molecular weight of 500 to 5,000, polycarbonate polyol having an average functionality of 2 to 5 and a molecular weight from 400 to 5,000, polyether polyols having an average functionality of 2 to 5 and an average molecular weight of 400 to 12,000, polyester polyols having an average functionality of 2 to 5 and a molecular weight from 500 to 5,000, and any combinations thereof.

According to another embodiment of the present disclosure, the first polyol comprises at least one of a $C_4$-$C_{16}$ branched aliphatic polyhydric alcohol comprising at least two hydroxyl groups and a polycarbonate polyol having an average functionality of 2 to 5 and a molecular weight from 500 to 3,000, and optionally further comprises one or more of poly($C_4$-$C_{12}$ lactone) polyol having an average molecular weight of 800 to 4,000, polyether polyols having an average functionality of 2 to 5 and an average molecular weight of 800 to 5,000, polyester polyols having an average functionality of 2 to 5 and a molecular weight from 800 to 4,000.

According to another embodiment of the present disclosure, the second polyol comprises linear polyester polyols having an average functionality of 2 to 5 and a molecular weight from 800 to 5,000, and optionally further comprises one or both of poly($C_4$-$C_{12}$ lactone) polyol having an average molecular weight of 500 to 5,000 and polyether polyols having an average functionality of 2 to 5 and an average molecular weight of 400 to 12,000.

According to another embodiment of the present disclosure, the first polyol is selected from:

(a) a blend of one polycarbonate polyol having an average functionality of 2 and a molecular weight from 1,000 to 3,000, one polylactone polyol having an average functionality of 2 and a molecular weight from 1,000 to 3,000 and one polyester polyol having an average functionality of 2 and a molecular weight from 1,000 to 3,000; and (b) a blend of trimethylpentane-diol, one polyester polyol having an average functionality of 2 and a molecular weight from 1,000 to 3,000, and one polyether polyol having an average functionality of 2 and a molecular weight from 1,000 to 3,000.

According to another embodiment of the present disclosure, the second polyol is selected from (c) one linear polyester polyol having an average functionality of 2 and a molecular weight from 1,000 to 3,000; and (d) a blend of one linear polyester polyol having an average functionality of 2 and a molecular weight from 1,000 to 3,000 with at least one of poly($C_4$-$C_{12}$ lactone) polyol having an average functionality of 2 and an average molecular weight of 1,000 to 3,000 and polyether polyol having an average functionality of 2 and an average molecular weight of 1,000 to 3,000.

According to another embodiment of the present disclosure, each of the first internal emulsifier and the second internal emulsifier is independently selected from the group consisting of $C_2$-$C_{16}$ aliphatic acid or salt thereof substituted with at least two hydroxyl groups or amino groups, $C_5$-$C_{16}$ cycloaliphatic acid or salt thereof substituted with at least two hydroxyl groups or amino groups, and any combinations thereof.

According to another embodiment of the present disclosure, the acrylic copolymer of the polyacrylic emulsion is derived from third raw materials comprising 60% to 80% by weight of at least one $C_1$-$C_{12}$ alkyl (meth)acrylate, from 1% to 10% by weight of (meth)acrylic acid, and 10% to 30% by weight of styrene and/or $C_1$-$C_6$ alkyl substituted styrene, based on total solid weight of the polyacrylic emulsion.

According to another embodiment of the present disclosure, the weight ratio of the first polyurethane dispersion, the second polyurethane dispersion and the polyacrylic emulsion is (10-15):(1-7):(1-8).

In a second aspect of the present disclosure, the present disclosure provides a method of producing a laminated material, comprising:
  (a) providing a metal foil and a substrate;
  (b) applying the waterborne coating composition of the present disclosure onto at least one surface of the metal foil to form a wet coating, then curing and drying the wet coating to form a dry coating layer; and
  (c) laminating the substrate onto the dry coating layer under pressure and elevated temperature to form the laminated material.

In a third aspect of the present disclosure, the present disclosure provides a laminated material comprising a metal foil, a substrate, and a bonding layer sandwiched therebetween, wherein the bonding layer is derived from the waterborne coating composition of the present disclosure.

In a fourth aspect of the present disclosure, the present disclosure provides a use of the waterborne coating composition of the present disclosure in the preparation of a PTP (Press through Packaging) foil.

It is to be understood that both the foregoing general description and the following detailed description are exemplary and explanatory only and are not restrictive of the invention, as claimed.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, "and/or" means "and, or as an alternative". All ranges include endpoints unless otherwise indicated.

As disclosed herein, the term "composition", "formulation" or "mixture" refers to a physical blend of different components, which is obtained by mixing simply different components by a physical means. The term "dispersion" refers to a physical blend comprising a liquid continuous phase and at least one solid and/or liquid dispersed phase, preferable a solid dispersed phase, dispersed in the liquid continuous phase. "Dispersion" is a general concept which may include a solution (i.e. the dispersed phase is soluble in the continuous phase) or a suspension (i.e. the dispersed phase is at least partially insoluble in the continuous phase). According to a preferable embodiment of the present disclosure, the solid dispersed phase is uniformly dispersed in the liquid continuous phase. The term "emulsion", as used herein, refers to a basically stable physical mixture of a liquid continuous phase and at least one solid and/or liquid dispersed phase dispersed in the liquid continuous phase, wherein the dispersed phase is partially or substantially immiscible to the liquid continuous phase. The stability of the emulsion is preferably derived from the electrostatic repulsive effect.

As disclosed herein, the term "glass transition temperature" or "Tg" is determined by differential scanning calorimetry (DSC).

As disclosed herein, all percentages mentioned herein are by weight, temperatures in ° C., and the average molecular weight refers to number average molecular weight (Mn), unless specified otherwise.

As used herein, the term "(meth)acrylate" refers to acrylate or methacrylate, the term "(meth)acrylic" refers to acrylic or methacrylic, and the term "(co)polymer" refers to a polymer or a copolymer.

According to one embodiment of the present disclosure, the waterborne coating composition of the present disclosure is substantially free of any organic solvent intentionally added therein. For example, the total amount of organic solvent is less than 5%, or less than 4%, preferably less than 2%, more preferably less than 1%, more preferably less than 0.1%, more preferably less than 0.01%, more preferably less than 100 ppm, more preferably less than 50 ppm, more preferably less than 10 ppm, more preferably less than 1 ppm by weight based on total weight of the waterborne coating composition. As disclosed herein, the term "solvent" of "solvent borne" refers to organic liquid whose function is solely dissolving one or more solid, liquid or gaseous materials without incurring any chemical reaction. In other words, although some organic compounds, e.g. ethylene glycol, propylene glycol, and other polyols, which are generally considered as "solvent" in the polymerization technology, might be used in the preparation of one or more polymeric components such as the polyurethane, none of them belongs to "solvent" since they mainly function as isocyanate-reactive functional substance, adhesion promoter, chain extending agent, modifier, emulsifier, etc. by incurring chemical reactions. According to a preferable embodiment of the present disclosure, the waterborne coating composition only comprises water as the solvent and comprises no organic solvent intentionally added therein.

In the context of the present disclosure, all the raw materials used for preparing the first polyurethane are described with the term "first", and the raw materials for the second polyurethane are described with the term "second", so as to clearly distinguish them from each other.

According to various embodiments of the present disclosure, the waterborne coating composition comprises (a) a first polyurethane dispersion, (b) a second polyurethane dispersion different from the first polyurethane dispersion, and (c) a polyacrylate emulsion, and the formulation design of each component will be particularly introduced in the following paragraphs.

The First Polyurethane Dispersion

In one embodiment of the present disclosure, the first polyurethane dispersion comprises first polyurethane dispersed in water, and the first polyurethane dispersion has a Tg of 5° C. to 20° C., such as from 10° C. to 15° C., or within a numerical range obtained by combining any two of the following values: 5° C., 6° C., 7° C., 8° C., 9° C., 10° C., 11° C., 12° C., 13° C., 14° C., 15° C., 16° C., 17° C., 18° C., 19° C., 20° C. According to one embodiment of the present disclosure, the solid content of the first polyurethane dispersion is from 20 to 50% by weight, such as from 22 to 48%, or from 24 to 46%, or from 25 to 45%, or from 27 to 42%, or from 30 to 40%, or from 32 to 38%, or from 34 to 36%, based on the total weight of the first polyurethane dispersion. Alternatively, the first polyurethane dispersion may have a solid content within a numerical range obtained by combining any two of the following percentage values: 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt % and 50 wt %.

According to one embodiment of the present disclosure, the first polyurethane is in the form of fine particles. For example, the fine particles of the first polyurethane may have a particle size of 10 nm to 500 nm, or from 20 nm to 450 nm, or from 30 nm to 400 nm, or from 50 nm to 350 nm, or from 60 nm to 300 nm, or from 80 nm to 250 nm, or from 90 nm to 200 nm, or from 100 nm to 180 nm, or from 120 nm to 150 nm, or can be within a numerical range obtained by combining any two of the above said end point values.

According to one embodiment of the present disclosure, the first polyurethane is prepared by reacting at least one first monomeric diisocyanate with at least one first polyol and at least one first internal emulsifier.

According to one embodiment of the present disclosure, the first monomeric diisocyanate can be selected from the group consisting of $C_2$-$C_{16}$ aliphatic diisocyanate, $C_6$-$C_{16}$ aromatic diisocyanate, $C_5$-$C_{16}$ cycloaliphatic diisocyanate, and combination thereof. The aliphatic diisocyanate may include but are not limited to, for example, ethylene diisocyanate, propylene diisocyanate, butylene diisocyanate, pentamethylene diisocyanate, hexamethylene diisocyanate (HDI). The cycloaliphatic diisocyanate may include but are not limited to, cyclopentylene diisocyanate, cyclohexylene diisocyanate, isophorone diisocyanate(IPDI) and methylene-bis-(4-cyclohexylisocyanate)(HMDI). The preferred aromatic diisocyanate are selected from phenylene diisocyanate, methylene diphenyl diisocyanate (MDI), toluene diisocyanate (TDI), carbodiimide modified MDI, naphthylene diisocyanate and the combination thereof. TDI can be generally used with any commonly available isomer distribution. The most commonly available TDI has an isomer distribution of 80% of the 2,4-isomer and 20% of the 2,6-isomer. TDI with other isomer distributions can also be used. When MDI is used, it is preferably pure 4,4'-MDI or any combinations of MDI isomers. More preferably, it is pure 4,4'-MDI, and any combinations of 4,4'-MDI with other MDI isomers. When the combinations of 4,4'-MDI with other MDI isomers are used, the preferred concentration of 4,4'-MDI is from 25% to 75% of all the MDI isomers. According to an alternative embodiment of the present disclosure, examples of aromatic diisocyanate include, but are not limited to, isomers of methylene diphenyl dipolyisocyanate ("MDI") such as 4,4-MDI, 2,4-MDI and 2,2'-MDI, or modified MDI such as carbodiimide modified MDI or allophanate modified MIDI; isomers of toluene-dipolyisocyanate ("TDI") such as 2,4-TDI, 2,6-TDI, isomers of naphthalene-dipolyisocyanate ("NDI") such as 1,5-NDI, and combinations thereof. In a more preferable embodiment of the present disclosure, the first monomeric diisocyanate can be selected from the group consisting of 1,6-hexamethylene diisocyanate, isophorone diisocyanate, 4,4'-diisocyanato dicyclohexylmethane, di-isocyanatomethyl-cyclo-hexane, and any combinations thereof.

The amount of the first monomeric diisocyanate can be from 15 wt % to 45 wt %, such as in the numerical range obtained by combining any two of the following end point values: 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, and 45 wt %, based on the total solid weight of the first polyurethane contained in the first polyurethane dispersion.

According to one embodiment of the present disclosure, the monomeric diisocyanates preferably have a molecular weight Mn of less than 500 g/mol, preferably less than 300 g/mol, and more preferably less than 275 g/mol.

The first polyol for preparing the first polyurethane is selected from the group consisting of $C_2$-$C_{16}$ aliphatic polyhydric alcohols comprising at least two hydroxyl groups, $C_6$-$C_{15}$ cycloaliphatic or aromatic polyhydric alcohols comprising at least two hydroxyl groups, $C_7$-$C_{15}$ araliphatic polyhydric alcohols comprising at least two hydroxyl groups, poly($C_4$-$C_{12}$ lactone) polyol having an average molecular weight of 500 to 8,000, polycarbonate polyol having an average functionality of 2 to 5 and a molecular weight from 400 to 5,000, polyether polyols having an average functionality of 2 to 5 and an average molecular weight of 400 to 12,000, polyester polyols having an average functionality of 2 to 5 and a molecular weight from 500 to 5,000, and any combinations thereof.

According to an embodiment of the present disclosure, the first polyol comprises at least one of a $C_4$-$C_{16}$ branched aliphatic polyhydric alcohol comprising at least two hydroxyl groups and a polycarbonate polyol having an average functionality of 2 to 5 and a molecular weight from 600 to 3,000, and may further comprise one or more of the following polyols as optional options: poly($C_4$-$C_{12}$ lactone) polyol having an average molecular weight of 800 to 4,000, polyether polyols having an average functionality of 2 to 5 and an average molecular weight of 800 to 5,000, polyester polyols having an average functionality of 2 to 5 and a molecular weight from 800 to 5,000.

As used herein, the term "branched aliphatic polyhydric alcohol comprising at least two hydroxyl groups" refers to an aliphatic polyhydric alcohol having at least two hydroxyl groups and at least two "branching groups" selected from the group consisting of methyl, ethyl, propyl, butyl, pentyl and hexyl. For example, the $C_2$-$C_{16}$ aliphatic polyhydric alcohols comprising at least two hydroxyl groups can be an ethylene glycol, propanediol, butanediol, pentanediol or hexanediol substituted with two, three, four, five or six "branching groups" selected from the group consisting of methyl, ethyl, propyl, butyl, pentyl and hexyl. According to a preferable embodiment of the present application, the branched aliphatic polyhydric alcohol of the present disclosure is trimethylpentane-diol, such as 2,2,4-trimethylpentane-1,3-diol (TMPD).

According to one embodiment of the present disclosure, the above said polycarbonate polyol has a hydroxyl functionality of 2 to 5, such as 2 to 4, or 2 to 3, or about 2. According to another embodiment of the present disclosure, the above said polycarbonate polyol has a Mn of 400 to 5,000, such as from 800 to 4,500, or within a numerical range obtained by combining any two of the following values: 400, 500, 600, 700, 800, 900, 1,000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000 g/mol.

According to an embodiment of the present disclosure, the first polyol comprises either of the above stated $C_4$-$C_{16}$ branched aliphatic polyhydric alcohol and the polycarbonate polyol, or a combination thereof.

According to another embodiment of the present disclosure, the first polyols comprise the above stated $C_4$-$C_{16}$ branched aliphatic polyhydric alcohol, and further comprise one or more of poly($C_4$-$C_{12}$ lactone) polyol having an average molecular weight (Mn) of 800 to 4,000, polyether polyols having an average functionality of 2 to 5 and an average molecular weight of 400 to 5,000, polyester polyols having an average functionality of 2 to 5 and a molecular weight from 800 to 4,000. According to another embodiment of the present disclosure, the first polyols comprise the above stated polycarbonate polyol, and further comprise one or more of poly($C_4$-$C_{12}$ lactone) polyol having an average molecular weight of 800 to 4,000, polyether polyols having an average functionality of 2 to 5 and an average molecular weight of 400 to 5,000, polyester polyols having an average functionality of 2 to 5 and a molecular weight from 800 to 4,000.

In the above stated embodiments, the amount of the $C_4$-$C_{16}$ branched aliphatic polyhydric alcohol can be from 2 wt % to 30 wt %, such as 3 wt % to 20 wt %, or at most 15 wt %, or at most 10 wt %, or at most 5 wt % of the total weight of the first polyols. In the above stated embodiments, the amount of the above stated "polycarbonate polyol" can be from 10 wt % to 50 wt %, such as 15 wt % to 45 wt %, or 20 wt % to 40 wt %, or 25 wt % to 35 wt %, of the total weight of the first polyols.

The above stated polyether polyols are the addition polymerization products and the graft products of ethylene oxide, propylene oxide, tetrahydrofuran, and butylene oxide, the condensation products of polyhydric alcohols, and any combinations thereof. Suitable examples of the polyether polyols include polypropylene glycol (PPG), polyethylene glycol (PEG), polybutylene glycol, polytetramethylene ether glycol (PTMEG), and any combinations thereof. Preferably, the polyether polyols are the combinations of PEG and at least one another polyether polyol selected from the above described addition polymerization and graft products, and the condensation products. More preferably, the polyether polyols are the combinations of PEG and at least one of PPG, polybutylene glycol, and PTMEG. According to an embodiment of the present disclosure, the above stated polyether polyols has a Mn of 400 to 12,000, such as from 800 to 5,000, or within a numerical range obtained by combining any two of the following values: 400, 500, 600, 700, 800, 900, 1,000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5500, 6000, 6500, 7000, 7500, 8000, 8500, 9000, 9500, 10000, 10500, 11000, 11500, 12000 g/mol. According to an embodiment of the present disclosure, the amount of the above stated polyether polyols can be 0-50 wt %, or at most 40 wt %, or at most 30 wt %, or at most 20 wt %, or at most 10 wt % of the total weight of the first polyols.

Examples of the above stated polyester polyols are the condensation products or their derivatives of diols, and dicarboxylic acids and their derivatives. Suitable examples of the diols are ethylene glycol, butylene glycol, diethylene glycol, triethylene glycol, polyalkylene glycols such as polyethylene glycol, 1,2-propanediol, 1,3-propanediol, 2-methyl-1,3-propandiol, 1,3-butanediol, 1,4-butanediol, 1,6-hexanediol, neopentyl glycol, 3-methyl-1,5-pentandiol, and any combinations thereof. In order to achieve a polyol functionality of greater than 2, triols and/or tetraols may also be used. Suitable examples of such triols include trimethylolpropane and glycerol. Suitable examples of such tetraols include erythritol and pentaerythritol. Dicarboxylic acids are selected from aromatic acids, aliphatic acids, and the combination thereof. Suitable examples of the aromatic acids are phthalic acid, isophthalic acid, and terephthalic acid; while suitable examples of the aliphatic acids are adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, and 2,2-dimethyl succinic acid. Anhydrides of these acids can likewise be used. For the purpose of the present invention, the anhydrides are accordingly encompassed by the expression of term "acid". Preferably, the aliphatic acids and aromatic acids are saturated, and are respectively adipic acid and isophthalic acid. Monocarboxylic acids, such as benzoic acid and hexane carboxylic acid, should be minimized or excluded. According to an embodiment of the present disclosure, the above stated polyether polyols has a Mn of 500 to 5,000, such as from 800 to 4,000, or within a numerical range obtained by combining any two of the following values: 500, 600, 700, 800, 900, 1,000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000 g/mol. According to an embodiment of the present disclosure, the amount of the above stated polyester polyols can be 0-55 wt %, or 20-50 wt % of the total weight of the first polyols.

The above stated polylactone polyol refers to a polymeric polyol prepared by addition polymerization of at least one $C_4$-$C_{12}$ lactone with diols, triols and/or tetraols. Suitable examples of lactone include propiolactone, caprolactone, butyrolactone and valerolactone, such as ε-caprolactone, β-propiolactone, γ-butyrolactone, methyl-ε-caprolactone or mixtures thereof. Suitable examples of the diols are ethylene glycol, butylene glycol, diethylene glycol, triethylene glycol, polyalkylene glycols such as polyethylene glycol, 1, 2-propanediol, 1, 3-propanediol, 2-methyl 1, 3-propandiol, 1, 3-butanediol, 1, 4-butanediol, 1, 6-hexanediol, neopentyl glycol, 3-methyl 1, 5-pentandiol and any combinations thereof. Suitable examples of triols include trimethylolpropane and glycerol. Suitable examples of tetraols include erythritol and pentaerythritol. According to an embodiment of the present disclosure, the above stated polylactone polyol has a Mn of 500 to 5,000, such as from 800 to 4,000, or within a numerical range obtained by combining any two of the following values: 500, 600, 700, 800, 900, 1,000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000 g/mol. According to an embodiment of the present disclosure, the amount of the above stated polylactone polyol can be 0-40 wt %, or 0-35 wt % of the total weight of the first polyols.

The total amount of the first polyols can be from 40 wt % to 75 wt %, such as in the numerical range obtained by combining any two of the following end point values: 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, based on the total solid weight of the first polyurethane contained in the first polyurethane dispersion.

According to one preferable embodiment of the present disclosure, one polycarbonate polyol, one polylactone polyol and one polyester polyol as stated above are used in combination as the first polyols for preparing the first polyurethane. Preferably, the weight ratio among these polyols can be polycarbonate polyol:polylactone polyol:polyester polyol=(0.3-3):(0.3-3):(0.3-3), such as (0.7-1.5):(0.7-1.5):(0.7-1.5), or (0.75-1.4):(0.75-1.4):(0.75-1.4). According to one preferable embodiment, the first polyol is a blend of one polycarbonate polyol having an average functionality of 2 and a molecular weight from 1,000 to 3,000, one polylactone polyol having an average functionality of 2 and a molecular weight from 1,000 to 3,000 and one polyester polyol having an average functionality of 2 and a molecular weight from 1,000 to 3,000.

According to another preferable embodiment of the present disclosure, one $C_4$-$C_{16}$ branched aliphatic polyhydric alcohol, one polyester polyol and one polyether polyol as stated above are used in combination as the first polyols for preparing the first polyurethane. Preferably, the weight ratio between these polyols can be $C_4$-$C_{16}$ branched aliphatic polyhydric alcohol:polyester polyol:polyether polyol=(0.05-5):(5-20):(5-20), such as (0.08-3):(7-15):(7-15), or (0.9-1.5):(8-12):(8-12), or (0.95-1.1):(9-11):(9-11). According to one preferable embodiment, the first polyol is a blend of trimethylpentane-diol, one polyester polyol having an average functionality of 2 and a molecular weight from 1,000 to 3,000, and one polyether polyol having an average functionality of 2 and a molecular weight from 1,000 to 3,000.

The first internal emulsifier used for preparing the first polyurethane is preferably anionic. Suitable examples of the first internal emulsifier are selected from the group consisting of $C_2$-$C_{16}$ aliphatic acid or salt thereof substituted with at least two hydroxyl groups or amino groups, $C_5$-$C_{16}$ cycloaliphatic acid or salt thereof substituted with at least two hydroxyl groups or amino groups, sulfonates, phosphates, carboxylates, and any combinations thereof. Preferably, the first internal emulsifier includes 2,2-dimethylol propionic acid and its derivatives.

The amount of the first internal emulsifier can be from 1 wt % to 15 wt %, such as in the numerical range obtained by combining any two of the following end point values: 1 wt %, 1.2 wt %, 1.4 wt %, 1.5 wt %, 1.8 wt %, 2 wt %, 2.2 wt %, 2.4 wt %, 2.5 wt %, 2.8 wt %, 3 wt %, 3.2 wt %, 3.4 wt %, 3.5 wt %, 3.6 wt %, 3.8 wt %, 4.0 wt %, 4.2 wt %, 4.5 wt %, 4.8 wt %, 5.0 wt %, 5.2 wt %, 5.5 wt %, 5.8 wt %, 6.0 wt %, 6.2 wt %, 6.5 wt %, 6.8 wt %, 7.0 wt %, 7.2 wt %, 7.5 wt %, 7.8 wt %, 8.0 wt %, 8.2 wt %, 8.5 wt %, 8.8 wt %, 9.0 wt %, 9.2 wt %, 9.5 wt %, 9.8 wt %, 10.0 wt %, 10.5 wt %, 11 wt %, 11.2 wt %, 11.4 wt %, 11.5 wt %, 11.8 wt %, 12 wt %, 12.2 wt %, 12.4 wt %, 12.5 wt %, 12.8 wt %, 13 wt %, 13.2 wt %, 13.4 wt %, 13.5 wt %, 13.6 wt %, 13.8 wt %, 14.0 wt %, 14.2 wt %, 14.5 wt %, 14.8 wt %, 15.0 wt %, based on the total solid weight of the first polyurethane contained in the first polyurethane dispersion.

According to one embodiment of the present disclosure, at least one chain extender or crosslinker may be present in the reactants used for preparing the first polyurethane dispersion. A chain extender or crosslinker can be a chemical having two isocyanate-reactive groups per molecule and an equivalent weight per isocyanate-reactive group of less than 300, preferably less than 200 and especially from 31 to 125. The isocyanate reactive groups are preferably hydroxyl, primary aliphatic or aromatic hydroxyl/amino, or secondary aliphatic or aromatic hydroxyl/amino groups. Representative chain extender or crosslinkers include ethylene glycol, diethylene glycol, triethylene glycol, 1,2-propylene glycol, dipropylene glycol, tripropylene glycol, 1,4-butanediol, cyclohexane dimethanol, ethylene diamine, phenylene diamine, bis(3-chloro-4-aminophenyl)methane, dimethyl-thio-toluenediamine and diethyltoluenediamine.

According to one embodiment of the present disclosure, the content of the chain extender or crosslinker can be from 2 wt % to 12 wt %, such as in the numerical range obtained by combining any two of the following end point values: 2 wt %, 2.2 wt %, 2.4 wt %, 2.5 wt %, 2.8 wt %, 3 wt %, 3.2 wt %, 3.4 wt %, 3.5 wt %, 3.6 wt %, 3.8 wt %, 4.0 wt %, 4.2 wt %, 4.5 wt %, 4.8 wt %, 5.0 wt %, 5.2 wt %, 5.5 wt %, 5.8 wt %, 6.0 wt %, 6.2 wt %, 6.5 wt %, 6.8 wt %, 7.0 wt %, 7.2 wt %, 7.5 wt %, 7.8 wt %, 8.0 wt %, 8.2 wt %, 8.5 wt %, 8.8 wt %, 9.0 wt %, 9.2 wt %, 9.5 wt %, 9.8 wt %, 10.0 wt %, 10.2 wt %, 10.5 wt %, 10.8 wt %, 11.0 wt %, 11.2 wt %, 11.5 wt %, 11.8 wt %, 12.0 wt %, based on the total solid weight of the first polyurethane contained in the first polyurethane dispersion.

The pH of the reaction mixture can be adjusted by adding acid or base therein during the preparation of the first polyurethane dispersion. Examples of base include, but are not limited to ammonia, diethylamine, triethylamine, dimethylethanolamine, triethanolamine, sodium hydroxide, potassium hydroxide, and sodium acetate. Examples of acids include, but are not limited to, acetic acid, formic acid, hydrochloric acid, nitric acid, and toluene sulfonic acid.

The first polyurethane of the first polyurethane dispersion has a glass transition temperature (Tg) of 5-20° C., such as in the numerical range obtained by combining any two of the following end point values: 5° C., or 6° C., or 7° C., or 8° C., or 9° C., or 10° C., or 11° C., or 12° C., or 13° C., or 14° C., or 15° C., or 16° C., or 17° C., or 18° C., or 19° C., or 20° C.

The Second Polyurethane Dispersion

In one embodiment of the present disclosure, the second polyurethane dispersion comprises second polyurethane dispersed in water, wherein the solid content of the second polyurethane is from 30 to 50% by weight, such as from 32 to 49%, or from 34 to 48%, or from 35 to 47%, or from 37 to 46%, or from 38 to 45%, or from 40 to 44%, or from 42 to 43%, based on the total weight of the second polyurethane dispersion. Alternatively, the second polyurethane dispersion may have a solid content within a numerical range obtained by combining any two of the following percentage values: 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt % and 50 wt %.

According to one embodiment of the present disclosure, the second polyurethane is in the form of fine particles. For example, the fine particles of the second polyurethane may have a particle size of 15 nm to 600 nm, or from 20 nm to 500 nm, or from 30 nm to 450 nm, or from 50 nm to 400 nm, or from 60 nm to 350 nm, or from 80 nm to 300 nm, or from 90 nm to 250 nm, or from 100 nm to 200 nm, or from 120 nm to 150 nm, or can be within a numerical range obtained by combining any two of the above said end point values.

According to one embodiment of the present disclosure, the second polyurethane is prepared by reacting at least one second monomeric diisocyanate with at least one second polyol and at least one second internal emulsifier.

According to one embodiment of the present disclosure, the second monomeric diisocyanate can be selected from the group consisting of $C_2$-$C_{16}$ aliphatic diisocyanate, $C_6$-$C_{16}$ aromatic diisocyanate, $C_5$-$C_{16}$ cycloaliphatic diisocyanate, and combination thereof. The aliphatic diisocyanate may include but are not limited to, for example, ethylene diisocyanate, propylene diisocyanate, butylene diisocyanate, pentamethylene diisocyanate, hexamethylene diisocyanate (HDI). The cycloaliphatic diisocyanate may include but are not limited to, cyclopentylene diisocyanate, cyclohexylene diisocyanate, isophorone diisocyanate(IPDI) and methylene-bis-(4-cyclohexylisocyanate)(HMDI). The preferred aromatic diisocyanate are selected from phenylene diisocyanate, methylene diphenyl diisocyanate (MDI), toluene diisocyanate (TDI), carbodiimide modified MDI, naphthylene diisocyanate and the combination thereof. TDI can be generally used with any commonly available isomer distribution. The most commonly available TDI has an isomer distribution of 80% of the 2,4-isomer and 20% of the 2,6-isomer. TDI with other isomer distributions can also be used. When MDI is used, it is preferably pure 4,4'-MDI or any combinations of MDI isomers. More preferably, it is pure 4,4'-MDI, and any combinations of 4,4'-MDI with other MDI isomers. When the combinations of 4,4'-MDI with other MDI isomers are used, the preferred concentration of 4,4'-MDI is from 25% to 75% of all the MDI isomers. According to an alternative embodiment of the present disclosure, examples of aromatic diisocyanate include, but are not limited to, isomers of methylene diphenyl dipolyisocyanate ("MDI") such as 4,4-MDI, 2,4-MDI and 2, 2'-MDI, or modified MDI such as carbodiimide modified MDI or allophanate modified MIDI; isomers of toluene-dipolyisocyanate ("TDI") such as 2,4-TDI, 2,6-TDI, isomers of naphthalene-dipolyisocyanate ("NDI") such as 1,5-NDI, and combinations thereof. In a more preferable embodiment of the present disclosure, the second monomeric diisocyanate can be selected from the group consisting of 1,6-hexamethylene diisocyanate, isophorone diisocyanate, 4,4'-diisocyanato dicyclohexylmethane, di-isocyanatomethyl-cyclohexane, and any combinations thereof.

The amount of the second monomeric diisocyanate can be from 10 wt % to 35 wt %, such as in the numerical range obtained by combining any two of the following end point values: 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, and 35 wt %, based on the total solid weight of the second polyurethane contained in the second polyurethane dispersion.

According to one embodiment of the present disclosure, the second monomeric diisocyanates preferably have a molecular weight Mn of less than 500 g/mol, preferably less than 300 g/mol, and more preferably less than 275 g/mol.

According to one embodiment of the present disclosure, the second polyol for preparing the second polyurethane comprises polyester polyols having an average functionality of 2 to 5 and a molecular weight from 600 to 6,000, optionally further comprises one or both of poly($C_4$-$C_{12}$ lactone) polyol having an average molecular weight of 500 to 8,000 and polyether polyols having an average functionality of 2 to 5 and an average molecular weight of 400 to 12,000. According to a preferable embodiment of the present disclosure, the above stated polyester polyol is prepared by using adipic acid (ADA) and one or both of hexane diol (MO, more preferably 1,6-hexane diol) and butane diol (BDO, more preferably 1,4-butane diol).

According to one embodiment of the present disclosure, the above said polyester polyol has a hydroxyl functionality of 2 to 5, such as 2 to 4, or 2 to 3, or about 2. According to another embodiment of the present disclosure, the above said polyester polyol has a Mn of 800 to 5,000, such as from 1,000 to 4,500, or within a numerical range obtained by combining any two of the following values: 800, 900, 1,000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000 g/mol.

According to an embodiment of the present disclosure, the polyester polyols are the condensation products or their derivatives of diols, and dicarboxylic acids and their derivatives. Suitable examples of the diols are 1,3-butanediol, 1,4-butanediol, 1,6-hexanediol, and any combinations thereof. Dicarboxylic acids are selected from aromatic acids, aliphatic acids, and the combination thereof. Suitable examples of the aromatic acids are phthalic acid, isophthalic acid, and terephthalic acid; while suitable examples of the aliphatic acids are adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, and 2,2-dimethyl succinic acid. Anhydrides of these acids can likewise be used. For the purpose of the present invention, the anhydrides are accordingly encompassed by the expression of term "acid". Preferably, the aliphatic acids and aromatic acids are saturated, and are respectively adipic acid and isophthalic acid. Monocarboxylic acids, such as benzoic acid and hexane carboxylic acid, should be minimized or excluded. According to a preferable embodiment, most of, such as at least 90%, or at least 95%, or at least 99%, or all of the polyester polyol for the second polyol has a "linear structure". As used herein, the term "linear polyester polyol" refers to polyester polyol derived from carboxylic acid(s) and diol(s) without any side chain or branched structure.

According to an embodiment of the present disclosure, the amount of the polyester polyol can be from 35 wt % to 100 wt %, such as at least 40 wt %, or at least 50 wt %, or at least 60 wt %, or at least 70 wt %, or at least 80 wt %, or at least 85 wt % of the total weight of the second polyols.

According to one embodiment of the present disclosure, polyether polyol and polylactone polyol can be optionally used for the second polyols. According to a preferable embodiment, most of, such as at least 90%, or at least 95%, or at least 99%, or all of the polyether polyol and polylactone polyol for the second polyol have a "linear structure". As used herein, the terms "linear polyether polyol" and "linear polylactone polyol" refers to polyether polyol and polylactone polyol without any side chain or branched structure. Preferably, the second polyols do not comprise polycarbonate polyol or $C_2$-$C_{16}$ aliphatic polyhydric alcohols, and particularly do not comprise $C_4$-$C_{16}$ branched aliphatic polyhydric alcohol.

According to an embodiment of the present disclosure, the amount of the above stated optional polyether polyols can be 0-50 wt %, or at most 40 wt %, or at most 30 wt %, or at most 20 wt %, or at most 15 wt % of the total weight of the second polyols. According to another embodiment of the present disclosure, the amount of the above stated polylactone polyol can be 0-40 wt %, or at most 40 wt %, or at most 30 wt %, or at most 20 wt %, or at most 15 wt % of the total weight of the second polyols. The above said polyether polyol and polylactone polyol for the first polyols may be used as optional components in the second polyols.

According to one preferable embodiment of the present disclosure, the total amount of the second polyols can be from 50 wt % to 75 wt %, such as in the numerical range obtained by combining any two of the following end point values: 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, and 75 wt %, based on the total solid weight of the second polyurethane contained in the second polyurethane dispersion.

According to one preferable embodiment of the present disclosure, one polyester polyol as stated above is exclusively used as the second polyols for preparing the second polyurethane. According to another preferable embodiment of the present disclosure, one polyester polyol as stated above is used in combination with one polyether polyol as stated above as the second polyols for preparing the second polyurethane.

The second internal emulsifier used for preparing the second polyurethane is preferably anionic. Suitable examples of the second internal emulsifier are selected from the group consisting of $C_2$-$C_{16}$ aliphatic acid or salt thereof substituted with at least two hydroxyl groups or amino groups, $C_5$-$C_{16}$ cycloaliphatic acid or salt thereof substituted with at least two hydroxyl groups or amino groups, sulfonates, phosphates, carboxylates, and any combinations thereof. Preferably, the second internal emulsifier includes 2,2-dimethylol propionic acid and its derivatives.

The amount of the second internal emulsifier can be from 2 wt % to 10 wt %, such as in the numerical range obtained by combining any two of the following end point values: 2 wt %, 2.2 wt %, 2.4 wt %, 2.5 wt %, 2.8 wt %, 3 wt %, 3.2 wt %, 3.4 wt %, 3.5 wt %, 3.6 wt %, 3.8 wt %, 4.0 wt %, 4.2 wt %, 4.5 wt %, 4.8 wt %, 5.0 wt %, 5.2 wt %, 5.5 wt %, 5.8 wt %, 6.0 wt %, 6.2 wt %, 6.5 wt %, 6.8 wt %, 7.0 wt %, 7.2 wt %, 7.5 wt %, 7.8 wt %, 8.0 wt %, 8.2 wt %, 8.5 wt %, 8.8 wt %, 9.0 wt %, 9.2 wt %, 9.5 wt %, 9.8 wt % and 10.0 wt %, based on the total solid weight of the second polyurethane contained in the second polyurethane dispersion.

According to one embodiment of the present disclosure, at least one chain extender or crosslinker may be present in the reactants used for preparing the second polyurethane dispersion. The above indicated categories and contents of the chain extender or crosslinker for the first polyurethane also apply to those for the second polyurethane.

The pH of the reaction mixture can be adjusted by adding acid or base therein during the preparation of the first polyurethane dispersion. Examples of base include, but are not limited to ammonia, diethylamine, triethylamine, dimethylethanolamine, triethanolamine, sodium hydroxide, potassium hydroxide, and sodium acetate. Examples of acids include, but are not limited to, acetic acid, formic acid, hydrochloric acid, nitric acid, and toluene sulfonic acid.

The second polyurethane of the second polyurethane dispersion has a glass transition temperature (Tg) of −40 to −60° C., such as in the numerical range obtained by combining any two of the following end point values: −60° C., or −58° C., or −56° C., or −55° C., or −54° C., or −53° C., or −52° C., or −51° C., or −50° C., or −49° C., or −48° C., or −47° C., or −46° C., or −45° C., or −44° C., or −43° C., or −42° C., or −41° C., or −40° C.

The Acrylic Emulsion

The acrylic emulsion is a latex, which is an aqueous dispersion of particles of a copolymer derived from at least one (meth)acrylic monomer and at least one styrenic monomer. The copolymer may further comprise additional comonomers other than said (meth)acrylic monomer and styrenic monomer, which might include, for example, vinyls (e.g., acetates, such as vinyl acetate, ethylene vinyl acetate; alcohols; chlorides such as polyvinyldichloride, polyvinyl chloride; or the like). The latex will typically exhibit a viscosity ranging from about 10 to 1000 cps and more preferably from 20 to 500 cps at 25° C. The acrylic emulsion may have a solid content of range from 35-65%, such as in the numerical range obtained by combining any two of the following end point values: 35 wt %, 38 wt %, 40 wt %, 42 wt %, 44 wt %, 45 wt %, 46 wt %, 48 wt %, 50 wt %, 52 wt %, 54 wt %, 55 wt %, 57 wt %, 58 wt %, 60 wt %, 61 wt %, 62 wt %, 63 wt %, 64 wt % and 65 wt %, based on the total weight of the polyacrylic emulsion. In one embodiment, the copolymer in the polyacrylic emulsion may have a number average molecular weight of between 5000 and 2,000,000 and more preferably between 100,000 and 2,000,000.

According to one embodiment of the present disclosure, the copolymer may comprise from 5 wt % to 50 wt % repeating units derived from at least one styrenic monomer, based on the total solid weight of the polyacrylic emulsion. Alternatively, the content of polymerized residues derived from at least one styrenic monomer can be within the numerical range obtained by combining any two of the following end point values: 5 wt %, 8 wt %, 10 wt %, 12 wt %, 15 wt %, 18 wt %, 20 wt %, 22 wt %, 25 wt %, 28 wt %, 30 wt %, 32 wt %, 35 wt %, 38 wt %, 40 wt %, 42 wt %, 44 wt %, 45 wt %, 48 wt %, and 50 wt %, based on the total solid weight of the polyacrylic emulsion. The styrenic monomer may include styrene or $C_1$-$C_6$ alkyl substituted styrene, such as styrene or α-methylstyrene.

According to one preferable embodiment of the present disclosure, the copolymer may comprise from 50 wt % to 90 wt % polymerized residues derived from at least one $C_1$-$C_{20}$ alkyl (meth)acrylate monomer, and optionally, 1 wt % to 15 wt % repeating units derived from at least one ethylenically unsaturated acid having at least one carboxylic acid group, based on the total solid weight of the polyacrylic emulsion.

For example, the content of the repeating units derived from at least one $C_1$-$C_{20}$ alkyl (meth)acrylate monomer can be within the numerical range obtained by combining any two of the following end point values: 50 wt %, 52 wt %, 55 wt %, 58 wt %, 60 wt %, 62 wt %, 65 wt %, 68 wt %, 70 wt %, 72 wt %, 75 wt %, 78 wt %, 80 wt %, 82 wt %, 85 wt %, 88 wt %, and 90 wt %, based on the total solid weight of the polyacrylic emulsion. According to one embodiment of the present disclosure, the $C_1$-$C_{20}$ alkyl (meth)acrylate monomer can be $C_4$-$C_{12}$ alkyl (meth)acrylate ester monomer(s), such as methyl methacrylate (MMA), ethyl methacrylate (EMA), butyl methacrylate (BMA), ethylhexyl methacrylate (ERMA), lauryl methacrylate (LMA), hydroxyethyl methacrylate (HEMA), methyl acrylate (MA), ethyl acrylate (EA), butyl acrylate (BA), isobutyl acrylate (IBA), ethylhexyl acrylate (EHA) and hydroxyethyl acrylate (HEA).

The content of the repeating unit derived from at least one ethylenically unsaturated acid can be within the numerical range obtained by combining any two of the following end point values: 1 wt %, 2 wt %, 3 wt %, 4 wt %, 5 wt %, 6 wt %, 7 wt %, 8 wt %, 9 wt %, 10 wt %, 11 wt %, 12 wt %,

15

13 wt %, 14 wt %, and 15 wt %, based on the total solid weight of the polyacrylic emulsion. According to one embodiment of the present disclosure, the ethylenically unsaturated acid can be acrylic acid, methacrylic acid, itaconic acid, fumaric acid or a combination thereof.

According to one embodiment of the present disclosure, the copolymer in the polyacrylic emulsion comprises less than 0.5% residues of hydroxyl-containing monomers. Preferably, the polymer has less than 0.3% of such residues, more preferably less than 0.2%, and most preferably the polymer is substantially free of residues of hydroxyl-containing monomers. Examples of hydroxyl-containing monomers include, e.g., HEMA, HEA, vinyl alcohol, hydroxypropyl methacrylate (RPMA) and hydroxypropyl acrylate. Preferably, the polymer is substantially free of amino-containing monomers. Preferably, the polymer has less than 0.5% of isocyanate-reactive groups other than carboxylic acid groups, more preferably less than 0.2%, and most preferably, the polymer is substantially free of isocyanate-reactive groups other than carboxylic acid groups.

Ordinary processing agents such as surfactant, initiator, etc. can be used for preparing the polyacrylic emulsion. For example, surfactants may be employed during the preparation of the polyacrylic emulsion to provide stability and to control particle size. Conventional surfactants include anionic or nonionic emulsifiers or their combination. Typical anionic emulsifiers include, but are not limited to alkali or ammonium alkyl sulfates, alkali or ammonium alkylether sulfates, alkali or ammonium alkylarylether sulfates, alkyl sulfonates, salts of fatty acids, esters of sulfosuccinic acid salts, alkyl diphenylether disulfonates, and salts or free acids of complex organic phosphate esters. Typical nonionic emulsifiers include, but are not limited to polyethers, e.g. ethylene oxide and propylene oxide condensates which include straight and branched chain alkyl and alkylaryl polyethylene glycol and polypropylene glycol ethers and thioethers, alkyl phenoxypoly(ethyleneoxy) ethanols having alkyl groups containing from about 7 to about 18 carbon atoms and having from about 4 to about 100 ethyleneoxy units, and polyoxyalkylene derivatives of hexitol, including sorbitans, sorbides, mannitans, and mannides. Surfactants may be employed at levels of 0.1 to 5 wt %, based on the total weight of the resultant polyacrylic emulsion.

According to an embodiment of the present disclosure, the acrylic emulsion has a Tg of −40° C. to −20° C., such as in the numerical range obtained by combining any two of the following end point values: −40° C., or −39° C., or −38° C., or −37° C., or −36° C., or −35° C., or −34° C., or −33° C., or −32° C., or −31° C., or −30° C., or −29° C., or −28° C., or −27° C., or −26° C., or −25° C., or −24° C., or −23° C., or −22° C., or −21° C., or −20° C.

Other additives One or more catalysts may be optionally used to promote or accelerate the above stated polymerization reaction for preparing the first and second polyurethane dispersions. The catalyst may include any substance that can promote the reaction between the isocyanate group and the hydroxy group. Without being limited to theory, the catalysts can include, for example, glycine salts; tertiary amines; tertiary phosphines, such as trialkylphosphines and dialkylbenzylphosphines; morpholine derivatives; piperazine derivatives; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride and stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt; or mixtures thereof. In general, the content of the catalyst used herein is larger than zero and is at most 1.0 wt %, preferably at most 0.5 wt %, more preferably at most 0.05 wt %, based on the total weight of all the reactants. According to another embodiment of the present disclosure, either or both of the first and second polyurethane dispersions are prepared without using the catalyst.

The coating composition of the present disclosure may optionally comprise any additional auxiliary agents and/or additives for specific purposes. In one embodiment of the present disclosure, the auxiliary agents and/or additives be selected from the group consisting of tackifiers, plasticizers, rheology modifiers, antioxidants, fillers, colorants, pigments, water scavengers, surfactants, solvents, diluents, flame retardants, slippery-resistance agents, antistatic agents, preservatives, biocides, antioxidants and combinations of two or more thereof.

The Waterborne Coating Composition

According to an embodiment of the present application, the weight ratio of the first polyurethane dispersion, the second polyurethane dispersion and the polyacrylic emulsion can be (10-15):(1-7):(1-8).

According to one embodiment of the present disclosure, the relative content of the first polyurethane dispersion can be from 50 to 75 parts by weight, such as within a numerical range obtained by any two of the following end point values: 50, 51, 52, 53, 54, 55, 56, 57, 58, 59, 60, 61, 62, 63, 64, 65, 66, 67, 68, 69, 70, 71, 72, 73, 74, and 75 parts by weight.

According to another embodiment of the present disclosure, the relative content of the second polyurethane dispersion can be from 10 to 25 parts by weight, such as within a numerical range obtained by any two of the following end point values: 10, 11, 12, 13, 14, 15, 16, 17, 18, 19, 20, 21, 22, 23, 24, and 25 parts by weight.

According to another embodiment of the present disclosure, the relative content of the polyacrylic emulsion can be from 5 to 40 parts by weight, such as within a numerical range obtained by any two of the following end point values: 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 and 40 parts by weight.

It shall be appreciated that the above stated contents of the first polyurethane dispersion, second polyurethane dispersion and polyacrylic emulsion are calculated by parts by weight instead of percentage by weight, thus the contents of these three components do not necessarily sum up to 100.

The PTP Sheet

According to one embodiment of the present disclosure, the waterborne coating composition of the present disclosure can be used for adhering at least two different layers together so as to form a laminated material, such as a PTP (Press through Packaging) sheet for medical pack. According to an exemplary of the present disclosure, a PTP sheet is comprised of a container film that has pocket portions filled with contents, such as tablets, and a cover film that is mounted to the container film such as to seal openings of the pocket portions. The container film can be made from different polymers such as polymethylmethacrylate, polypropylenecarbonate, polybutenecarbonate, polystyrene, acrylonitrile-butadiene-styrene resin, acrylic resin, polyvinyl chloride, polyvinyl alcohol, polycarbonates, polyethylene terephthalate, polyurethanes, polyimides, and copolymers thereof, and is preferably a transparent resin material, whereas the cover film can be made of metal foil, such as aluminum foil and aluminum alloy foil.

The waterborne coating composition of the present disclosure can be applied on the surface of the cover film, followed by drying and/or curing to form a bonding layer, and then the container film is compressed onto the exposed surface of the bonding layer under elevated temperature and pressure to form the PTP sheet, thus enclosing the medicines (e.g. tablets) within the pocket portions.

EXAMPLES

Some embodiments of the invention will now be described in the following Examples, wherein all parts and percentages are by weight unless otherwise specified. However, the scope of the present disclosure is not, of course, limited to the formulations set forth in these examples. Rather, the Examples are merely inventive of the disclosure.

Preparation Example 2: Preparation of the First Polyurethane Dispersion (PUD-2)

12.5 g Desmodur W was added to the mixture of 10.0 g PTMEG2000, 10.5 g Bester 127, 1.0 g TMPD and 3 g Bis-MPA. Then the mixed contents reacted at 80° C. for 4 h to form a prepolymer. Then the prepolymer was transferred into a plastic jar, and TEA was added into plastic jar under high speed (2500 rpm) stirring for 2 minutes, thus neutralized the content in the plastic jar to a pH of around 7. 64.5 g cold DI water (5° C.) was added into plastic jar under high speed stirring to form a homogeneous oil-in-water dispersion, and 4.5 g EDA water solution (20%) was added into the dispersion slowly, with stirring at 1200 rpm for 20 minutes. The resultant dispersion is marked as PUD-2 and exhibits a Tg value of 15° C.

Preparation Example 3: Preparation of the Second Polyurethane Dispersion (PUD-3)

13 g Vestanat IPDI was added to the mixture of 33.5 g Bester 80 and 2.5 g Bis-MPA. Then the mixed contents reacted at 70° C. for 4.5 h to form a prepolymer. Then the

TABLE 1

| Raw Material Information | | |
|---|---|---|
| Sample | Description | Supplier |
| Vestanat IPDI | Isophorone diisocyanate | Evonik |
| Desmodur W | Methylene-bis-(4-cyclohexylisocyanate) | Covestro |
| Bester 121 | Polyester polyol having a Mn of around 2,000 | The Dow Chemical Company |
| Bester 127 | Polyester polyol having a Mn of round 2,000 | The Dow Chemical Company |
| Bester 80 | Polyester polyol having a Mn of around 2,000 | The Dow Chemical Company |
| Eternacoll UP-100 | Polycarbonate polyol having a Mn of around 1,000 | UBE |
| PTMEG2000 | Polytetramethylene Ether Glycol having a Mn of around 2,000 | Invista |
| Capa 220 | Polycaprolactone polyol having a Mn of around 2,000 | Perstorp |
| Bis-MPA | 2,2-Bis(hydroxymethyl)propionic acid | Perstorp |
| TEA | Triethylamine | Sinoreagent |
| APS | Ammonium persulfate | Sinoreagent |
| EDA | Ethylene diamine | Sinoreagent |
| RHODACAL DS-4 | Sodium dodecyl benzene sulfonate | Solvay Chemical |
| AEROSOL A-102 | Disodium ethoxylate succinate | Solvay Chemical |
| t-BHP | Tert-butyl hydroperoxide | The Dow Chemical Company |
| BA | Butyl acrylate | The Dow Chemical Company |
| ST | Styrene | The Dow Chemical Company |
| IA | Itaonic acid | Sinopharm Chemical Reagent |
| AA | Glacial acrylic acid | Sinopharm Chemical Reagent |
| APS | Ammonia persulfate | Sinopharm Chemical Reagent |
| IAA | Iso-Ascorbic Acid | Sinopharm Chemical Reagent |
| Bruggolite FF6 | initiator | Brüggmann Chemical |
| TMPD | 2,2,4-Trimethylpentane-1,3-diol | The Dow Chemical Company |

Preparation Example 1: Preparation of the First Polyurethane Dispersion (PUD-1)

11 g Desmodur W was added to the mixture of 7 g Capa220, 6 g Eternacoll UP-100 and 2.0 g Bis-MPA and 8 g Bester 127, then the mixed contents reacted at 75° C. under stirring for 4.5 hours to form a prepolymer. Then the prepolymer was transferred into a plastic jar, and ILA was added into plastic jar under high speed (2500 rpm) stirring for 2 minutes, thus neutralized the content in the plastic jar to a pH of around 7.66 g cold DI water (5° C.) was added into plastic jar under high speed stirring to form a homogeneous oil-in-water dispersion, and 3 g EDA aqueous solution (20%) was added into the dispersion slowly, with stirring at 1200 rpm for 20 minutes. The resultant dispersion is marked as PUD-1 and exhibits a Tg value of 10° C.

prepolymer was transferred into a plastic jar, and TEA was added into plastic jar under high speed (2500 rpm) stirring for 2 minutes, thus neutralized the content in the plastic jar to a pH of around 7.51 g cold DI water (5° C.) was added into plastic jar under high speed stirring to form a homogeneous oil-in-water dispersion, and 4.8 g EDA water solution (20%) was added into the dispersion slowly, with stirring at 1200 rpm for 20 minutes. The resultant dispersion is marked as PUD-3 and exhibits a Tg value of −47° C.

Preparation Example 4: Preparation of the Second Polyurethane Dispersion (PUD-4)

12.0 g Desmodur W was added to the mixture of 30 g Bester 121, 1.0 g Bis-MPA and 5.0 g Voranol™ PEG1000. Then the mixed contents reacted at 85° C. for 4 h to form a prepolymer. Then the prepolymer was transferred into a plastic jar, and TEA was added into plastic jar under high speed (2500 rpm) stirring for 2 minutes, thus neutralized the content in the plastic jar to a pH of around 7.52 g cold DI water (5° C.) was added into plastic jar under high speed stirring to form a homogeneous oil-in-water dispersion, and 4.0 g EDA water solution (20%) was added into the dispersion slowly, with stirring at 1300 rpm for 20 minutes. The resultant dispersion is marked as PUD-4 and exhibits a Tg value of –55° C.

Preparation Example 5: Preparation of the Second Polyurethane Dispersion (PUD-5)

10 g Vestanat IPDI was added to the mixture of 28 g Bester 121, and 2.0 g Bis-MPA. Then the mixed contents reacted at 70° C. for 4.5 h to form a prepolymer. Then the prepolymer was transferred into a plastic jar, and TEA was added into plastic jar under high speed (2600 rpm) stirring for 2 minutes, thus neutralized the content in the plastic jar to a pH of around 7.60 g cold DI water (5° C.) was added into plastic jar under high speed stirring to form a homogeneous oil-in-water dispersion, and 4.0 g EDA water solution (20%) was added into the dispersion slowly, with stirring at 1400 rpm for 25 minutes. The resultant dispersion is marked as PUD-5 and exhibits a Tg value of –52° C.

Preparation Example 6: Preparation of the Polyacrylic Emulsion (PAC-1)

2.38 g DS-4 was dissolved in 315 g deionized water (DI water) to form a solution, into which 31.9 g AA, 692.7 g BA and 173.2 g Sty were added slowly under agitation to form an emulsified monomer mixture.

A solution containing 5.62 g DS4 and 300 g deionized water were introduced into a 5-necked, 3 liter round bottom flask equipped with a thermocouple, a cooling condenser and an agitator, and heated to 84° C. under nitrogen atmosphere. A solution of 13.7 g itaconic acid (IA) dissolved in 180 g 60° C. DI water was added into the flask, and then 52.5 g of the above said monomer emulsion was added into the flask. Then a solution of 2.74 g Ammonium Persulfate (APS) in 20 g DI water was added into the flask to initiate the reaction. The temperature increased as the exothermic reaction proceeded, and when the temperature increases to a peak value of 84° C., rest of the monomer emulsion and a solution of APS (1.18 g in 44 g DI water) were gradually added within a duration of 150 minutes, during which the temperature was maintained at a level of 8385° C. After the addition had been finished, the vessel of the monomer emulsion and the feeding pipes leading into the flask were rinsed with 35 g DI water, and the rinsing water was also added into the flask. The flask was held at 84° C. for another 15 minutes, after which it was cooled to 75° C., and a solution of 3.58 g tert-Butyl Hydrogen peroxide in 40 g DI water and a solution of 2.29 g Iso-Ascorbic Acid in 47 g DI water were gradually fed into the flask over 30 minutes, then the reaction was cooled to room temperature. 19.5 g 25% aqueous ammonia was added into the flask to adjust pH value to 6.5~7.5. Then the content in the flask was diluted with DI water to a solid content of 46% and exhibited a Tg of –30° C.

Preparation Example 7: Preparation of the Polyacrylic Emulsion (PAC-2)

2.99 g sodium carbonate, 4.03 g DS-4 and 3.19 g A-102 were dissolved in 249 g deionized water to form a solution, into which 41.8 g AA, 968.3 g BA and 167.3 g Sty were added slowly under agitation to form an emulsified monomer mixture.

A solution containing 2.02 g DS4 and 224 g deionized water were introduced into a 5-necked, 3 liter round bottom flask equipped with a thermocouple, a cooling condenser and an agitator, and heated to 84° C. under nitrogen atmosphere. A solution of 18 g itaconic acid dissolved in 69 g 60° C. DI water was added into the flask, and then 20.1 g of the above said monomer emulsion was added into the flask. Then a solution of 3.6 g Ammonium Persulfate (APS) in 15 g DI water was added into the flask to initiate the reaction. The temperature increased as the exothermic reaction proceeded, and when the temperature increases to a peak value of 84° C., rest of the monomer emulsion and a solution of APS (1.18 g in 44 g DI water) were gradually added within a duration of 150 minutes, during which the temperature was maintained at a level of 8385° C. At 96.7 minutes, a solution of 16.11 g DS4 in 13 g DI water also started to be added into the flask. After the addition had been finished, the vessel of the monomer emulsion and the feeding pipes leading into the flask were rinsed with 50 g DI water, and the rinsing water was also added into the flask. The flask was held at 84° C. for another 15 minutes, after which it was cooled to 75° C., and a solution of 5.16 g tert-butyl hydrogen peroxide in 40 g DI water and a solution of 4.4 g FF6 in 40 g DI water were gradually fed into the flask over 30 minutes, then the flask was cooled to room temperature. 18.7 g 25% aqueous ammonia was added into the flask to adjust pH value to 6.5~7.5. Then the content in the flask was diluted with DI water to a solid content of 57.5% and exhibited a Tg of –25° C.

Inventive Examples 1-7 and Comparative Examples 1-7: Preparation of Coating Composition The PUD's and the PAC's prepared above were combined together according to the relative contents listed in the following table 2 to form coating compositions of Inventive Examples (IE) 1-7 and Comparative Examples (CE) 1-7.

TABLE 2

| | PUD-1 | PUD-2 | PUD-3 | PUD-4 | PUD-5 | PAC-1 | PAC-2 |
|---|---|---|---|---|---|---|---|
| | | | | Formulation information | | | |
| IE. 1 | 55 g | | 15 g | | | 30 g | |
| IE. 2 | 55 g | | | 15 g | | 30 g | |
| IE. 3 | 55 g | | | | 15 g | 30 g | |
| IE. 4 | 55 g | | 20 g | | | | 25 g |
| IE. 5 | | 50 g | 15 g | | | 35 g | |
| IE. 6 | 70 g | | 20 g | | | 10 g | |
| IE. 7 | 65 g | | 15 g | | | 20 g | |
| CE. 1 | | 85 g | 15 g | | | | |
| CE. 2 | 85 g | | 15 g | | | | |
| CE. 3 | | 85 g | | 15 g | | | |
| CE. 4 | | 85 g | | | 15 g | | |
| CE. 5 | | 85 g | | | | 15 g | |
| CE. 6 | | | 100 g | | | | |
| CE. 7 | | | | | | | 100 g |

Each of the above stated coating composition was used to produce a laminate of aluminum foil and PVC plate and subject to characterization of performance properties, and the characterization results were summarized in Table 3 below:

TABLE 3

| | Initial HSS(N/15 mm) | HSS after 1 d aging(N/15 mm) | HSS after 2 d aging(N/15 mm) | HSS after 3 d aging(N/15 mm) | Blocking resistance @60° C. for 4 h |
|---|---|---|---|---|---|
| | | | Performance Evaluation Results for Al foil/PVC | | |
| IE. 1 | 10 | 12 | 10.4 | 5.6 | Good |
| IE. 2 | 10.5 | 11.4 | 8 | 5.9 | Good |
| IE. 3 | 10.8 | 11.6 | 9.8 | 6.5 | Good |
| IE. 4 | 9.5 | 10.1 | 8.3 | 6.5 | Good |
| IE. 5 | 10.3 | 11 | 9.3 | 6.7 | Good |
| IE. 6 | 11.3 | 10.4 | 8.1 | 5.0 | Good |
| IE. 7 | 10.9 | 10.9 | 9.0 | 5.6 | Good |
| CE. 1 | 11 | 10.8 | 0 | 0 | Good |
| CE. 2 | 9.9 | 10 | 1.5 | 0 | Good |
| CE. 3 | 11.6 | 11.3 | 0 | 0 | Good |
| CE. 4 | 10 | 9.5 | 0 | 0 | Good |
| CE. 5 | 3.3 | 3.0 | 2.8 | 2.9 | Good |
| CE. 6 | 12.4 | 8.2 | 0 | 0 | Sticky |
| CE. 7 | 2.6 | 2.0 | 1.8 | 1.9 | Sticky |

HSS: heat seal strength; aging condition: 85° C. temperature and 85% humidity

It can be seen from Table 3 that the inventive examples (IE.1-7), which comprises two PUD's and one polyacrylic emulsion can still exhibit good heat seal strength after 3 days aging at 85° C. and 85% humidity and also achieve good anti-blocking resistance, whereas the comparative examples (CE.1-7) showed very poor performance.

Test Methods

Heat Seal Strength (HS)

The above formulated coating composition was coated onto one surface of an aluminum foil (100 mm×100 mm) with a dry coating weight of 3.2 gsm, the coated aluminum foil was heated at 150° C. for 30 seconds in an oven, and then removed from the oven and cooled down.

The coated foil was laminated with one piece of PVC plate (100 mm×100 mm) with the exposed surface of the coating layer facing the PVC plate, and the laminate was thermally compressed in a heat seal machine for a dwell time of 1 second under conditions of 150° C. sealing temperature and 0.2 MPa compression pressure, after which the sample was removed from the machine and cooled at ambient temperature for at least two hours.

Then each of the samples was cut into strips having a width of 15 mm, which was subject to heat seal strength test on a tensile strength machine. The testing was repeated three times for each sample and the average value of three tests was reported as the final result. In particular, the PVC plate was clipped on the upper side clamp, while aluminum foil was clipped on the down side clamp. As the test started, the tensile strength machine was turned on and the two clamps started to move at the speed of 200 mm/min±20 mm/min towards opposite directions to conduct a 180° peeling movement. At the same time, the heat seal strength values were recorded in a computer in real time. A higher value represents a better heat seal strength.

Blocking Resistance Test:

The above formulated coating composition was coated onto one surface of an aluminum foil (100 mm×100 mm) with a dry coating weight of 3.2 gsm, the coated aluminum foil was heated at 150° C. for 30 seconds in an oven, and then removed from the oven and cooled down.

Four pieces of the coated foil prepared above were overlapped on top of each other with the surface of each coating in contact with uncoated surface of another foil. The four-layer laminate sample was placed on a flat surface and a 1.0 kilo weight was placed on top thereof. The whole sample was heated in a 40° C. oven for 2 hours, and was then taken out for observation of blocking condition.

Aging Test:

The heat sealed laminates were kept in a conditioning chamber at conditions of 85° C. and 85% relative humidity for 3 days, and were taken out to monitor the heat seal strength every day.

Glass Transition Temperature (Tg)

Samples of PUD or PAC were heated to dry and were then transferred into an aluminum crucible and tested with a DSC Q2000 equipment from TA Instruments with the following program:

1. Rising temperature from −80° C. to 120° C. with a ramp rate of 20° C./min to erase thermal history;
2. Cooling down the sample to −80° C.;
3. Rising the temperature from −80° C. to 120° C. with a ramp rate of 10° C./min to characterize the DSC plot; and
4. Choosing the half height point of transition in the DSC plot as the glass transition temperature (Tg).

What is claimed is:

1. A waterborne coating composition, comprising:
(a) a first polyurethane dispersion, comprising a first polyurethane having a Tg of 5° C. to 20° C.,
(b) a second polyurethane dispersion, comprising a second polyurethane having a Tg of −40° C. to −60° C., and
(c) a polyacrylic emulsion, comprising an acrylic polymer or copolymer having a Tg of −40° C. to −20° C.,
wherein the first polyurethane is prepared by reacting at least one first monomeric diisocyanate with at least one first polyol and at least one first internal emulsifier;
wherein the second polyurethane is prepared by reacting at least one second monomeric diisocyanate with at least one second polyol and at least one second internal emulsifier; and
wherein the acrylic polymer or copolymer is a copolymer derived from at least one acrylic or methacrylic monomer and at least one styrenic monomer.

2. The waterborne coating composition of claim 1, wherein
the first polyurethane is derived from first raw materials comprising 15% to 45% by weight of the at least one first monomeric diisocyanate, 40% to 75% by weight of the at least one first polyol, and 2% to 15% by weight of the at least one first internal emulsifier, based on total dry weight of the first polyurethane dispersion;

the second polyurethane is derived from second raw materials comprising 10% to 35% by weight of the at least one second monomeric diisocyanate, 50% to 75% by weight of the at least one second polyol, and 2% to 15% by weight of the at least one second internal emulsifier, by weight based on total dry weight of the second polyurethane dispersion; and the acrylic polymer or copolymer is derived from third raw materials comprising 60% to 90% by weight of the at least one acrylic or methacrylic monomer and 10% to 40% by weight of the at least one styrenic monomer.

3. The waterborne coating composition of claim 1, wherein each of the first monomeric diisocyanate and the second monomeric diisocyanate is independently selected from the group consisting of $C_2$-$C_{16}$ aliphatic diisocyanate, $C_6$-$C_{16}$ aromatic diisocyanate, $C_5$-$C_{16}$ cycloaliphatic diisocyanate, and combination thereof.

4. The waterborne coating composition of claim 1, wherein the first polyol comprises at least one of a $C_4$-$C_{16}$ branched aliphatic polyhydric alcohol comprising at least two hydroxyl groups and a polycarbonate polyol having an average functionality of 2 to 5 and a molecular weight from 500 to 3,000, and optionally further comprises one or more of poly ($C_4$-$C_{12}$ lactone) polyol having an average functionality of 2 to 5 and an average molecular weight of 800 to 4,000, polyether polyols having an average functionality of 2 to 5 and an average molecular weight of 800 to 5,000, and polyester polyols having an average functionality of 2 to 5 and a molecular weight from 800 to 5,000; and the second polyol comprises polyester polyols having an average functionality of 2 to 5 and a molecular weight from 800 to 5,000, and optionally further comprises one or both of poly ($C_4$-$C_{12}$ lactone) polyol having an average functionality of 2 to 5 and an average molecular weight of 500 to 8,000 and polyether polyols having an average functionality of 2 to 5 and an average molecular weight of 400 to 12,000.

5. The waterborne coating composition of claim 1, wherein (A) the first polyol is selected from (a) a blend of one polycarbonate polyol having an average functionality of 2 and a molecular weight from 1,000 to 3,000, one polylactone polyol having an average functionality of 2 and a molecular weight from 1,000 to 3,000 and one polyester polyol having an average functionality of 2 and a molecular weight from 1,000 to 3,000; and (b) a blend of trimethylpentane-diol, one polyester polyol having an average functionality of 2 and a molecular weight from 1,000 to 3,000, and one polyether polyol having an average functionality of 2 and a molecular weight from 1,000 to 3,000; and/or (B) the second polyol is selected from (c) one linear polyester polyol having an average functionality of 2 and a molecular weight from 1,000 to 3,000; and (d) a blend of one linear polyester polyol having an average functionality of 2 and a molecular weight from 1,000 to 3,000 with at least one of poly ($C_4$-$C_{12}$ lactone) polyol having an average functionality of 2 and an average molecular weight of 1,000 to 3,000 and polyether polyol having an average functionality of 2 and an average molecular weight of 1,000 to 3,000.

6. The waterborne coating composition of claim 1, wherein each of the first internal emulsifier and the second internal emulsifier is independently selected from the group consisting of $C_2$-$C_{16}$ aliphatic acid or salt thereof substituted with at least two hydroxyl groups or amino groups, $C_5$-$C_{16}$ cycloaliphatic acid or salt thereof substituted with at least two hydroxyl groups or amino groups, and any combinations thereof.

7. The waterborne coating composition of claim 1, wherein the acrylic copolymer of the polyacrylic emulsion is derived from third raw materials comprising 60% to 80% by weight of at least one $C_1$-$C_{12}$ alkyl (meth)acrylate, from 1% to 10% by weight of at least one ethylenically unsaturated acid, and 10% to 40% by weight of styrene and/or $C_1$-$C_6$ alkyl substituted styrene, based on total solid weight of the polyacrylic emulsion.

8. The waterborne coating composition of claim 1, wherein the weight ratio of the first polyurethane dispersion, the second polyurethane dispersion and the polyacrylic emulsion is (10-15):(1-7):(1-8).

9. A method of producing a laminated material, comprising:

(a) providing a metal foil and a substrate;

(b) applying the waterborne coating composition according to claim 1 onto at least one surface of the metal foil to form a wet coating, then curing and drying the wet coating to form a dry coating layer; and (c) laminating the substrate onto the dry coating layer under pressure and elevated temperature to form the laminated material.

10. A laminated material comprising a metal foil, a substrate, and a coating layer sandwiched therebetween, wherein the coating layer is derived from the waterborne coating composition according to claim 1.

\* \* \* \* \*